United States Patent [19]

Vinegar et al.

[11] Patent Number: 4,583,046

[45] Date of Patent: Apr. 15, 1986

[54] APPARATUS FOR FOCUSED ELECTRODE INDUCED POLARIZATION LOGGING

[75] Inventors: Harold J. Vinegar; Monroe H. Waxman, both of Houston, Tex.

[73] Assignee: Shell Oil Company, Houston, Tex.

[21] Appl. No.: 505,623

[22] Filed: Jun. 20, 1983

[51] Int. Cl.⁴ .............................................. G01V 3/24
[52] U.S. Cl. .................................................... 324/373
[58] Field of Search ............... 324/366, 373, 374, 375, 324/362

[56] References Cited

U.S. PATENT DOCUMENTS

| 2,824,279 | 2/1958 | Ferre et al. | 324/373 |
| 2,884,590 | 4/1959 | Welz | 324/373 |
| 2,988,690 | 6/1961 | Love et al. | 324/362 X |
| 3,054,046 | 9/1962 | Holmes et al. | 324/373 |
| 3,772,589 | 11/1973 | Scholberg | 324/373 |
| 4,335,353 | 6/1982 | Lacour-Gayet | 324/366 |
| 4,359,687 | 11/1982 | Vinegar et al. | 324/366 |

OTHER PUBLICATIONS

Snyder et al; Complex Formation Resistivity-The Forgotten Half of the Resistivity Log, SPWLA 18th Annual Logging Symposium, Jun. 5-8, 1977, pp. 1-39.

*Primary Examiner*—Gerard R. Strecker

[57] ABSTRACT

An induced polarization tool using focused electrodes that uses direct coupling in the focusing loop to prevent spurious phase shifts. The invention uses a differential-in differential-out amplifier and voltage-controlled resistances to provide zero potential difference between pairs of monitoring electrodes. The measured current and voltage are digitized downhole and transmitted to the surface. At the surface means are provided for determining in-phase and quadrature response.

20 Claims, 8 Drawing Figures

SPLIT-SURVEY
ELECTRODE
ARRAY

FIG. 5

INDEPENDENT
FOCUSING
ELECTRODE
ARRAY

APPARATUS FOR FOCUSED ELECTRODE INDUCED POLARIZATION LOGGING

BACKGROUND OF THE INVENTION

The present invention pertains to an induced polarization logging system such as described in U.S. Pat. No. 4,359,687 by Harold J. Vinegar and Monroe H. Waxman, issued Nov. 16, 1982. In this patent there is described an induced polarization logging tool and method for determining the cation exchange capacity per unit pore volume $Q_v$, electrolyte conductivity $C_w$ and water saturation $S_w$ of shaly sand formations using in situ measurements. In particular, the patent described a logging tool having an insulated sonde with current and return electrodes together with voltage measurement and reference electrodes and means to determine both the in-phase and quadrature conductivity. The induced polarization logging tool described in U.S. Pat. No. 4,359,687 provides means for determining the value of $Q_v$, $C_w$ and $S_w$ from in situ measurements thereby greatly improving the evaluation of a formation penetrated by the borehole.

The above mentioned invention has several limitations, however. The presence of the borehole filled with conductive drilling mud requires use of borehole correction curves to obtain a true indication of the actual formation parameters. When the formation resistivity is considerably greater than the mud resistivity, very large borehole corrections are required. The problem is compounded in the case of formations heavily invaded by mud filtrate, where several different array spacings are required for a complete formation evaluation. Another problem occurs in logging thin formations, where the measured induced polarization is only a fraction of the true formation values. The formation thickness must be several times the AM array spacing in a Normal array to obtain a good approximation to the true formation values. The limitations of the above mentioned logging device arise from induced polarization currents channeling through the borehole and invaded zones, rather than into the uninvaded formation adjacent to the invention, two focusing electrodes are placed on opposite sides of the survey current electrode. The focusing electrodes inject current which is exactly in phase with the current injected at the survey current electrode. The current applied to the pair of focusing electrodes is controlled to provide zero potential difference between two pairs of monitoring electrodes that are positioned between the survey current and the focusing electrodes. The current injected at the focusing electrodes is supplied from the same current source as the survey current electrode and is controlled by voltage-variable resistors which ensure that the focusing currents and reference currents are exactly in phase.

Although it is common practice in the industry to use focused electrode arrays for resistivity logging, none of the prior art would be suitable for an induced polarization logging tool such as described in U.S. Pat. No. 4,359,687. This is because all prior devices use focusing electrodes which are transformer or capacitor coupled to the current source. Either transformer or capacitor coupling will create phase shifts between the focusing currents and the survey current that will distort the measurement of the formation phase shift, which is extremely small ($\sim 1$ milliradian). This is not a problem in resistivity logging where the phase shift is not measured. Since formation phase shift is the primary quantity measured in the induced polarization logging tool of U.S. Pat. No. 4,359,687, this would prevent obtaining accurate values for $Q_v$, $C_w$ and $S_w$ using in situ measurements.

SUMMARY OF THE INVENTION

The present invention utilizes the logging tool shown in the above referenced patent with the addition of a pair of focusing electrodes positioned one above and one below the survey current electrode, respectively. A pair of monitoring electrodes is positioned on each side of the survey current electrode between the survey current and focusing electrodes. The signals from the monitoring electrodes are used to control the current supplied to the focusing electrodes to provide a zero potential difference between the monitoring electrodes. The control circuits are direct-coupled resistive-type circuits so that no phase shift occurs in the focusing circuitry. The voltage signal is measured between a measurement electrode positioned between one pair of the monitoring electrodes and a reference electrode positioned beyond one of the focusing electrodes. Current flow to the survey current electrode is measured across a downhole reference resistance and both the reference current and the measured voltage signals are converted to digital signals for transmission to the surface. The use of direct coupling and only resistive-type loads eliminates the possibility of phase shifts in the circuits used for controlling the focusing electrodes and measuring the voltage. Similarly, the conversion of the signals to digital quantities downhole before transmission to the surface eliminates capacitive coupling in the logging cable. This preserves the phase relationship between the voltage and the current and permits an accurate measurement of the $Q_v$, $C_w$ and $S_w$ at the surface. Since the use of focusing electrodes ensures a deep penetration of the current into the formation, the focused induced polarization measurements will accurately reflect the true induced polarization parameters and characteristics of the formations even when the formation resistivity is 1000 times greater than the mud resistivity. The focused electrode tool also improves the response to the induced polarization of thin beds.

In addition to obtaining accurate measurement of phase shift and resistivity as described in the above referenced patent, the invention also provides means by which the self-potential of the formations can be determined at the same time that phase shift and resistivity measurements are made.

BRIEF DESCRIPTION OF THE DRAWINGS

The invention will be more easily understood from the following detailed description when taken in conjunction with the attached drawings in which.

DESCRIPTION OF PREFERRED EMBODIMENT

Figure 1:
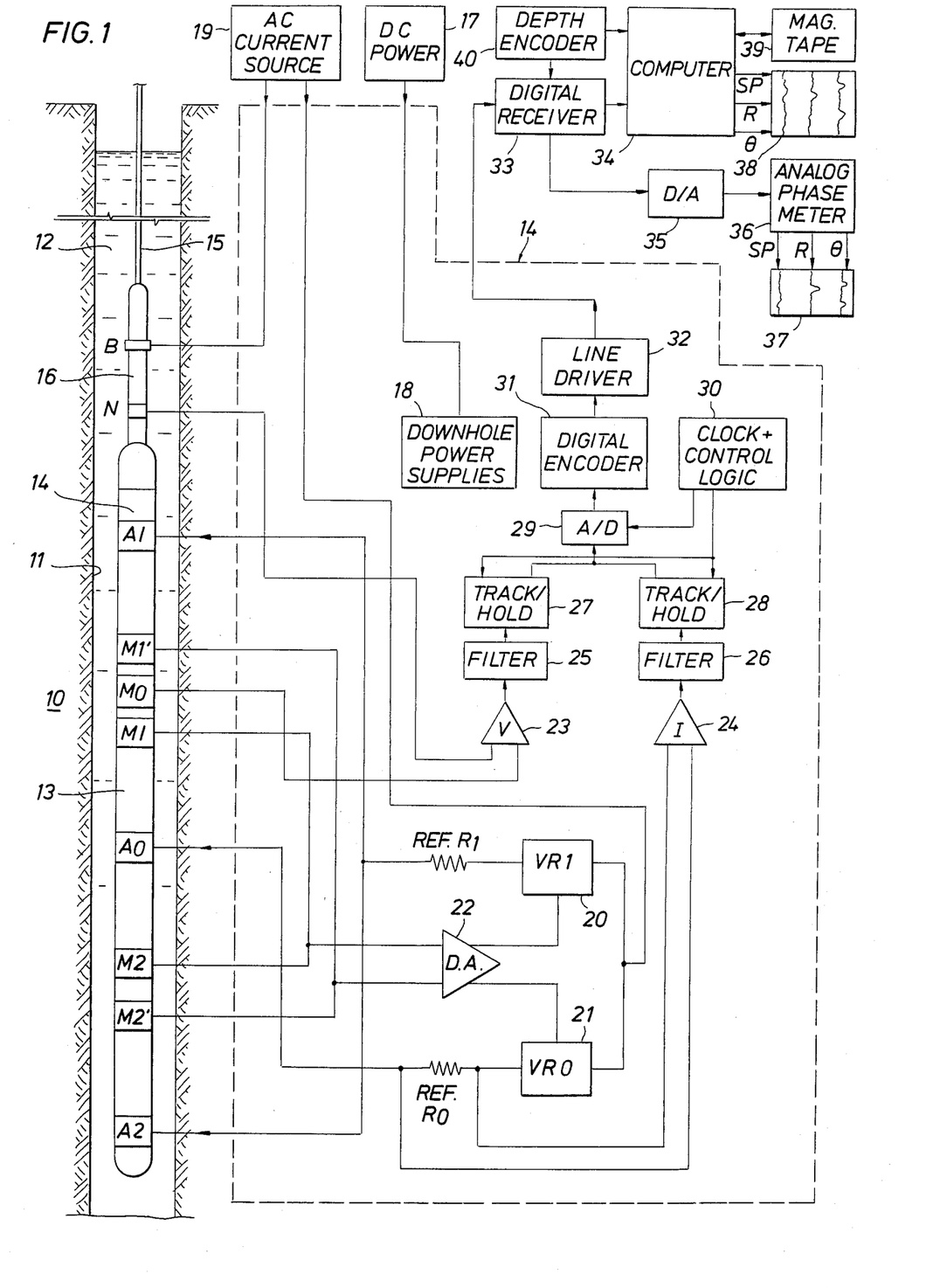
FIG. 1 is a block diagram of a logging system constructed according to the invention.

Referring to FIG. 1, there is shown a representative embodiment of the apparatus constructed in accordance with the teachings of this invention. The apparatus investigates subsurface earth formations 10 traversed by a borehole 11 that is filled with a conductive drilling fluid or mud 12 as is common practice in the industry. The logging apparatus includes a cylindrical support or housing member 13 to which are secured the electrodes of the present invention. Secured to the upper end of the support member 13 is the cylindrical fluid-tight housing 14. Housing 14 contains various electrical circuits used in the operation of the electrodes mounted on support member 13. The downhole apparatus, including support member 13 and fluid-tight housing 14, is suspended from the surface of the earth by means of a multiconductor cable 15, the lower hundred feet or so of which is covered with an electrical insulation material 16. At the surface, the cable 15 is reeled in and out of the borehole by a drum and winch mechanism (not shown).

The electrode system consists of a centrally located survey current electrode A0 attached to and supported by the support means 13, an upper focusing electrode A1 situated above survey current electrode A0 and a lower focusing electrode A2 situated a symmetrical distance below survey current electrode A0. An upper pair of monitor electrodes M1 and M1' are located on support means 13 between survey current electrode A0 and upper focusing electrode A1. Similarly, a lower pair of monitor electrodes M2 and M2' are situated on support means 13 between survey current electrode A0 and lower focusing electrode A2. Located equidistant between the upper pair of monitor electrodes M1 and M1' is the potential measurement electrode M0. Located above the fluid-tight housing 14 on the insulated portion 16 of armored multiconductor cable 15 is the potential reference electrode N. Located at some given distance above the potential reference electrode N is the current return electrode B.

The positions of the various electrodes shown in the drawing can vary somewhat depending on the borehole size, the desired depth of investigation, and the minimum bed thickness to be resolved on the log. Typically, the distance from survey current electrode A0 to the potential measurement electrode M0 is made equal to twice the borehole diameter. The minimum bed thickness will then be approximately twice the A0-M0 distance. The distance from the survey current electrode A0 to the focusing electrodes A1 and A2 is made between 2 and 3 times the A0-M0 distance. The distance between survey current electrode A0 and the potential reference electrode N is about 6 or 7 times the distance between survey current electrode A0 and focusing electrodes A1 or A2. The current return electrode B is preferably a relatively great distance from potential reference electrode N, and can be located at the surface. The A0-A1 and A0-A2 distances are at least 10 times the sonde diameter.

In order to generate a symmetric electrical response, electrode pairs located at equal distances on opposite sides of survey current electrode A0 are connected by insulated conductors of negligible resistance. Thus, upper monitor electrode M1 is connected to lower monitor electrode M2, upper monitor electrode M1' is connected to lower monitor electrode M2', and upper focusing electrode A1 is connected to lower focusing electrode A2.

Figure 2:
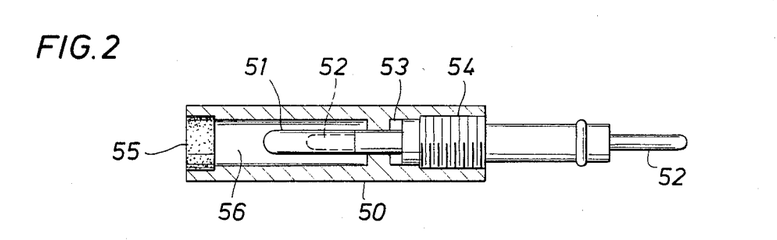
FIG. 2 is a vertical section of a silver/silver chloride electrode used in the invention.

All of the monitor electrodes M1, M1', M2, M2', as well as the potential measurement electrode M0 and the potential reference electrode N are non-polarizing, reversible electrodes such as silver/silver chloride electrodes. This prevents erroneous phase shifts due to electrochemical surface polarization, as would exist from the standard lead electrodes used in resistivity logging. Still another advantage of the silver/silver chloride electrode is the very low offset potential which enables the apparatus to employ the full dynamic range of the downhole amplifiers. One implementation of a high-pressure, high temperature silver/silver chloride electrode is shown in FIG. 2 and described below. The silver/silver chloride electrode is described and claimed in copending application Ser. No. 750,344 filed Jun. 28, 1985. The survey current electrode A0, focusing electrodes A1 and A2, and current return electrode B may be constructed from standard lead electrodes.

The electrical circuitry which is connected to the electrodes, is shown within dotted line box 14 which corresponds to the fluid-tight housing 14. The power for the downhole circuitry is supplied by DC power from the surface power supply 17 to the regulated downhole power supplies 18 through the armored multiconductor cable 15. One end of the alternating current source 19 located at the surface is connected via multiconductor cable 15 to the current return electrode B. The other end of the alternating current source 19 is connected via multiconductor cable 15 to voltage-controlled resistors 20 and 21. Voltage-controlled resistor 21 is connected through reference resistor R0 to survey current electrode A0. Voltage-controlled resistor 20 is connected through reference resistor R1 to focusing current electrodes A1 and A2.

The voltage-controlled resistors are to be construed as any implementation whereby a series resistance is varied by means of a control voltage. The voltage-controlled resistors 21 and 22 may be field effect power transistors whose source to drain resistance varies in response to the voltage applied to the gate. Monitor electrodes M1 and M2 are connected to one input terminal of differential amplifier 22. Monitor electrodes M1' and M2' are connected to the other input terminal of differential amplifier 22. Amplifier 22 is a differential-input, differential-output amplifier with very high input impedance. One output terminal from amplifier 22 is the control for voltage-controlled resistor 21. The other output terminal is the control for voltage-controlled resistor 20. The combination of the differential amplifier 22 and the voltage-controlled resistors 20 and 21 maintain substantially zero potential difference between monitor electrodes M1 and M1' and also between monitor electrodes M2 and M2'.

Potential measurement electrode M0 is connected to one input terminal of voltage amplifier 23 while the potential reference electrode N is connected to the other input terminal of voltage amplifier 23. Voltage amplifier 23 is a direct-coupled, very high input impedance differential amplifier which amplifies the potential difference generated by the applied AC current in the earth formation. The output of voltage amplifier 23 is connected to low-pass filter 25 whose function is to prevent aliasing of the voltage signal when it is converted to a digital signal. The output of the low-pass filter is sampled by the track-and-hold amplifier 27 which is controlled by the clock and control logic circuit 30. The sampled output from the track-and-hold amplifier 27 is digitized by the downhole analog-to-digital converter 29. The track-and-hold circuit follows the voltage signal and when actuated by the clock and logic circuit 30 samples the amplitude of the voltage signal.

Downhole current measurement is obtained by measuring the voltage across downhole reference resistor R0, using current amplifier 24. The output of current amplifier 24 is connected to low-pass filter 26, whose function is to prevent aliasing of the digital current signal. Low-pass filters 25 and 26 are substantially identical in order to prevent any differential phase shift from being introduced between the downhole measured current and voltage. The output of low-pass filter 26 is connected to track-and-hold amplifier 28. Track-and-hold amplifier 28 is substantially identical to track-and-hold amplifier 27 and is controlled by clock and control logic 30. The same control pulse is used for both track-and-hold amplifier 27 and 28 so that the current and voltage are sampled simultaneously. This prevents differential phase shift between the downhole measured current and voltage signals. The sampled output of track-and-hold amplifier 28 is applied to analog-to-digital converter 29. The sampled outputs from track-and-hold amplifiers 27 and 28 are multiplexed to the analog-to-digital converter 29 by the clock and control logic 30. Therefore, any drift in the analog-to-digital converter 29 characteristics occurs equally in current and voltage channels. The digitized current and voltage signals from the analog-to-digital converter 29 are digitally encoded into transmission code by the digital encoder 31 whose output goes to line driver 32. The line driver 32 is connected to the surface via the central conductor of multiconductor cable 15. The central conductor has been found to allow rapid transmission of digital signals without spurious cable reflections.

At the surface, the digital current and voltage signals are received by digital receiver 33, which decodes the transmission code. The digital receiver supplies the current and voltage signals to the digital computer, which computes spontaneous potential, resistivity and phase shift. The computer is connected to recording means 38 and storage means 39. The digital receiver 33 is also connected to digital-to-analog converter 35, which converts the digital current and voltage signals to analog form. The analog current and voltage signals from the digital-to-analog converter 35 go to analog phase meter 36 which measures spontaneous potential (SP), resistivity and phase shift. The output from analog phase meter 36 is recorded by recording means 37. A depth encoder 40 inputs depth information from the winch (not shown) to the computer.

The silver/silver chloride electrode shown in FIG. 2 consists of a housing 50 having a silver electrode 51 disposed therein. The surface of the silver electrode is converted to silver chloride by chloridization. The silver electrode is secured to the end of an electrode element 52 that projects outside of the housing. The electrode element is sealed in the housing by an "O" ring 53 that is compressed by a threaded packing gland 54. The volume 56 of the housing is filled with a saturated potassium chloride reference solution. A porous frit 55 in the end of the housing allows the potassium chloride solution to contact the borehole fluid.

Now, concerning the operation of the logging apparatus in FIG. 1, the AC current source supplies a constant amplitude alternating current of low frequency in the range 0.001–100 Hz, and preferably between 1 and 10 Hz. The frequency should not be greater than 100 Hz to prevent phase shifts from inductive coupling in the earth formation. If the frequency is too low, the logging speed becomes prohibitively long in order to prevent waveform distortion. A logging speed of 10 feet per minute has been found satisfactory with an AC current frequency of 10 Hz. The alternating current is applied both to the survey current electrode A0 and the focusing electrodes A1 and A2. The proportion of current split between survey and focusing electrodes is controlled by the voltage-controlled resistors 20 and 21, which function as a resistor-divider network. The voltage-controlled resistors must be purely resistive so that no phase shift is introduced between the current supplied to the survey current electrode A0 and the current supplied to the focusing electrodes A1 and A2. The current injected into the formation through the survey current electrode is measured across the reference resistor R0. In a homogeneous and isotropic earth formation, the resistance ratio of voltage-controlled resistor 20 to voltage-controlled resistor 21 is approximately:

$$VR1/VR0 = 0.5\,(n^2-1)^2/4n$$

where n is the ratio of the A1-A0 distance to the M0-A0 distance. (The reference resistors and formation resistance is assumed to be small relative to the voltage-controlled resistors.) However, opposite a thin resistive bed, the resistance of voltage-controlled resistor 20 is reduced relative to voltage-controlled resistor 21 in order to inject more current into focusing electrodes A1 and A2 than into A0. Reference resistor R1 can be used to monitor the focusing current (not shown). Values of reference resistors R0 and R1 of about 1 ohm have been found to give satisfactory signal levels. The differential amplifier 22 monitors the potential difference between M1 and M1' and between M2 and M2'. The differential output from differential amplifier 22 adjusts the ratio between current injected into survey current electrode A0 and current injected into focusing electrodes A1 and A2. This is accomplished by varying the resistance ratio between voltage-controlled resistors 20 and 21 until the potential difference between M1 and M1' and M2 and M2' is substantially equal to zero. Differential amplifier 22 and voltage-controlled resistors 20 and 21 must have sufficiently fast response relative to the AC current frequency that substantially zero additional phase shift is added by this control loop.

The survey current and the generated earth potential are both measured and digitized downhole. This avoids sending analog signals to the surface which would suffer large phase shifts from cable capacitance. A clock frequency of 4.4 KHz has been found satisfactory. This gives a current and voltage sample every 7 milliseconds. The Nyquist frequency is then 71 Hz. The low-pass filters are of the maximally-flat Butterworth type and are designed to give at least 48 dB attenuation at the Nyquist frequency. The analog-to-digital converter must have sufficient number of bits to achieve substantially low digitization noise. A 12-bit analog-to-digital converter has been found satisfactory to reduce phase noise below 1 milliradian. The gains of amplifiers 23 and 24 are automatically adjusted to keep at least eight significant bits at all times by suitable circuit means (not shown).

The digitized current and voltage signals are analyzed by a digital computer 34 which computes resistivity and phase shift of the earth formation from the measured current and voltage downhole. Since the entire current and voltage waveform (including both AC and DC components) have been digitized, the computer can also compute the spontaneous earth potential, SP.

Figure 6:
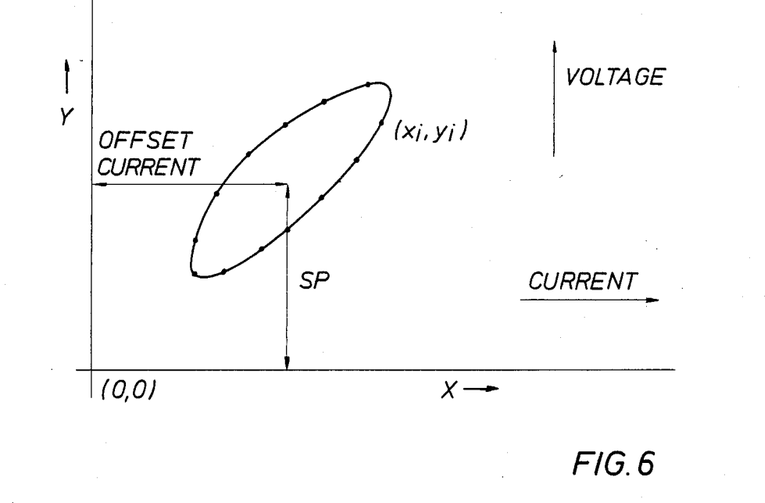
FIG. 6 is a plot of the measurement signals obtained with the logging tool of FIG. 1.

The data received at the surface by the digital receiver 33 will correspond to a series of points on an ellipse as shown in FIG. 6. The vertical offset of the center of the ellipse is the self potential of the formation while horizontal offset is the offset current. By proper control of AC input signal a zero current offset can be achieved.

The computer calculations for computing the formation parameters are listed below. They are valid for data samples uniformly spaced in time during a cycle of AC current. This, of course, is easily obtained using the clock-controlled logic circuit FIG. 1. In the following discussion the terms used are defined as:

N = number of ($x_i$, $y_i$) samples
K = tool geometry factor (in meters)
$G_v$ = voltage gain
$G_c$ = current gain
$V_i$ = $i^{th}$ voltage sample (in volts)
$C_i$ = $i^{th}$ current sample (in amperes)
$R_o$ = reference resistance (in ohms)
$x_i$ at any point is:

$$x_i = \frac{C_i}{R_o G_c}$$

$y_i$ at any point is:

$$y_i = \frac{V_i}{G_v}$$

while the average value of $\bar{x}$ and $\bar{y}$ are:

$$\bar{x} = \frac{\Sigma_i^N x_i}{N} \quad \bar{y} = \frac{\Sigma_i^N y_i}{N}$$

Let $\sigma x$ and $\sigma y$ equal:

$$\sigma_x = \sqrt{\frac{\Sigma_i^N (x_i - \bar{x})^2}{N}} \quad \sigma_y = \sqrt{\frac{\Sigma_i^N (y_i - \bar{y})^2}{N}}$$

and $\sigma xy$ equal:

$$\sigma_{xy} = \frac{\Sigma_i^N (x_i - \bar{x})(y_i - \bar{y})}{N}$$

Then:
Offset current = $\bar{x}$ (in amperes)
Resistivity = $K(\sigma_y/\sigma_x)$ (in ohm-meter)

$$\text{Phase} = \cos^{-1}\left(\frac{\sigma_{xy}}{\sqrt{\sigma_x \sigma_y}}\right) \text{ (in radians)}$$

and
Spontaneous Potential = $\bar{y}$ (in volts)

Figure 7:
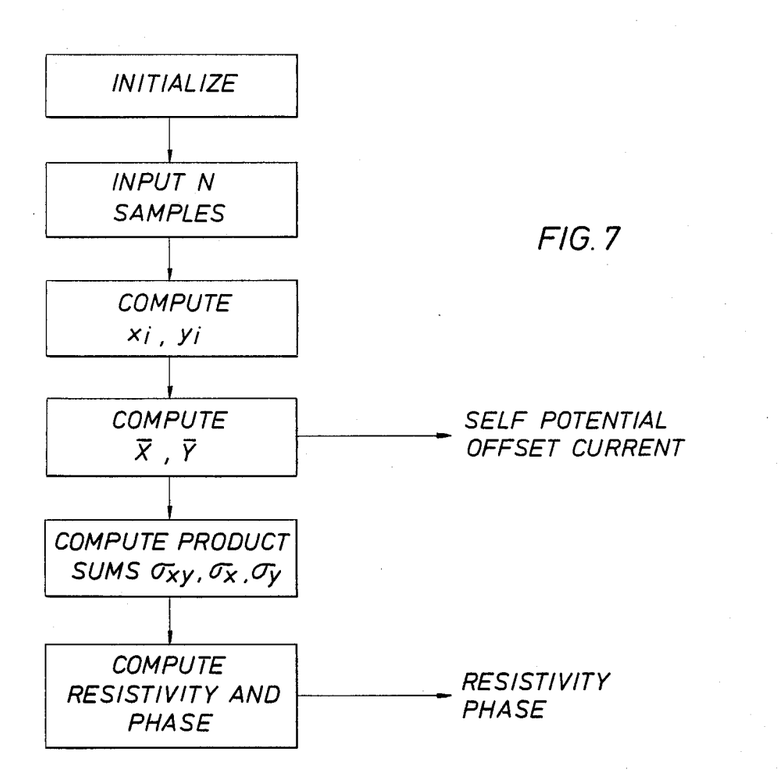
FIG. 7 is a flow diagram of a computer program for calculating various formation parameters.

A computer flow diagram for computing the above values is shown in FIG. 7. On skilled in the art using the diagram, can program a digital computer to perform the above calculations.

Figure 3:
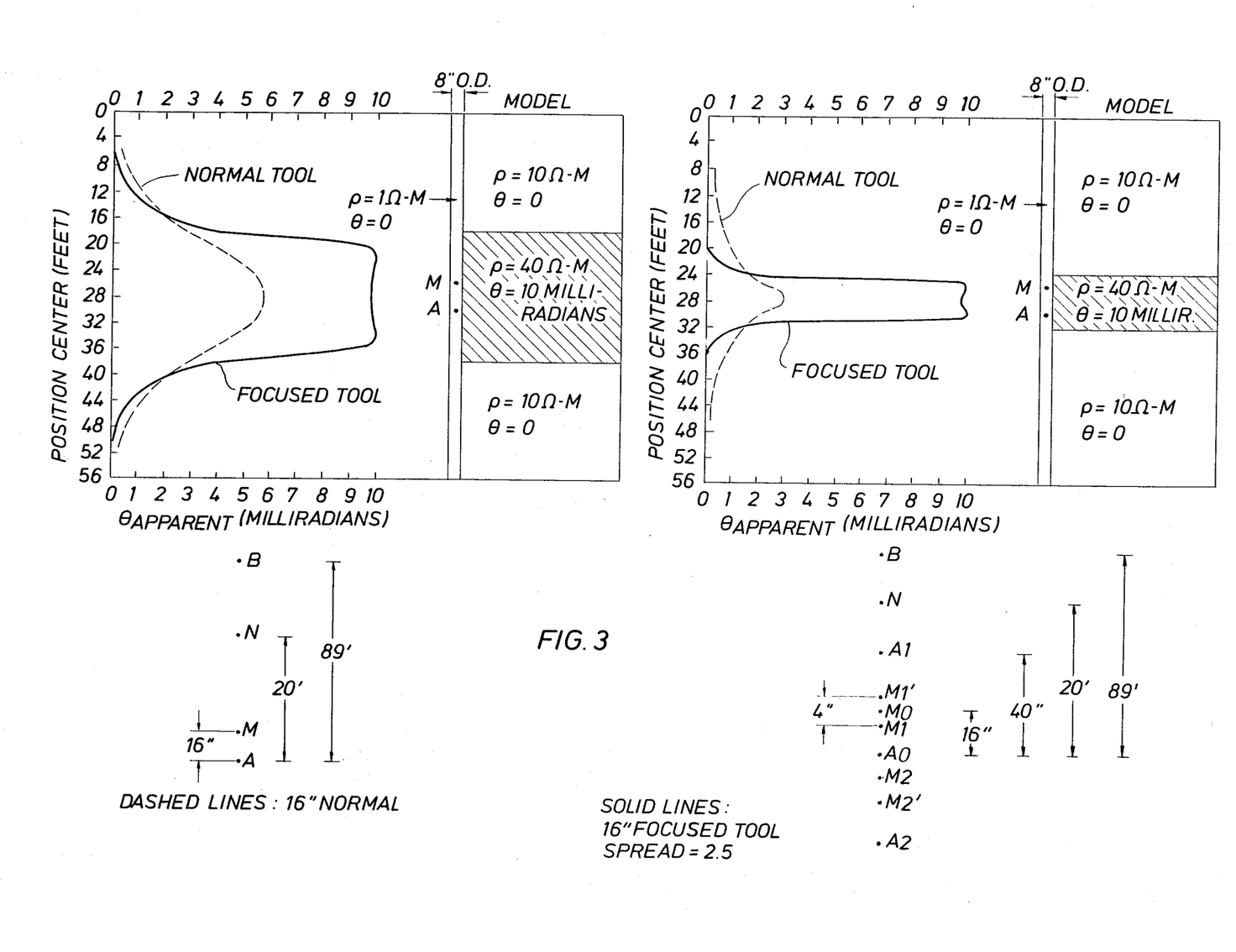
FIG. 3 shows electrode arrangements for focused and non-focused tools and the resulting logs obtained with them.

The present invention allows focusing of the survey current in the horizontal plane, so that the measured resistivity and the measured phase shift are substantially those of the formation adjacent to the tool. The focused induced polarization tool obtains substantially more accurate induced polarization measurements of the earth formation when the formation resistivity is much greater than the mud resistivity. Still another advantage of this focused induced polarization apparatus is the accurate response to thin resistive beds. This is shown by the computer-generated model in FIG. 3, which compares the response of the present invention with that of a 16" Normal non-focused induced polarization logging apparatus. The array dimensions being compared are shown in the Figure. It is evident from FIG. 3 that the phase shift measured by the focused induced polarization tool opposite a thin bed will be exceedingly close to the true bed phase shift even when the resistivity ratio between the thin bed and the surrounding beds is very high; whereas, the 16" Normal (and other non-focused arrays) measure an apparent phase shift which is substantially smaller than the true phase shift of the thin bed.

Figure 4:
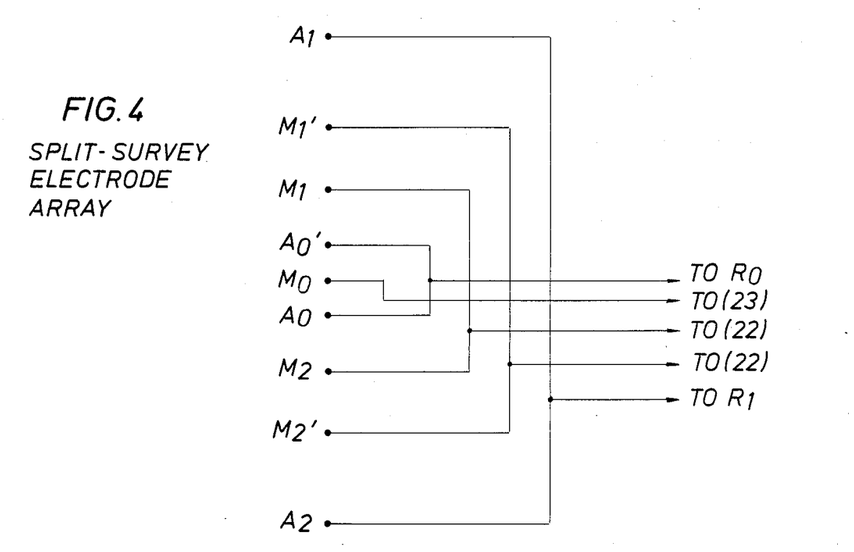
FIG. 4 is a modified electrode array of that shown in FIG. 1.
Figure 5:
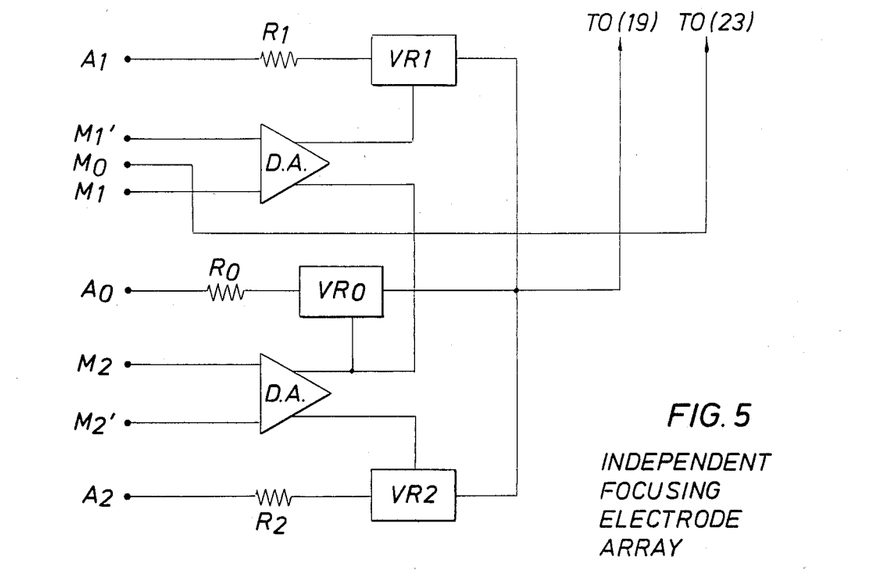
FIG. 5 is a different focusing electrode array.

It should be apparent to one skilled in the art that various modifications of the basic implementation shown in FIG. 1 are possible without violating the essence of this invention. Thus, the phasemeter and computer located at the surface could also have been located downhole within housing 14. In this case, digital transmission to the surface is not required. Another variation is the use of one of the monitoring electrodes M1, M1' or M2, M2' as the voltage measuring electrode instead of using a separate voltage measuring electrode M0. Also, within the spirit of this invention are other focused electrode arrays, such as the embodiment shown in FIG. 4. In this arrangement the survey current electrode A0 is divided into two electrodes A0 and A0' and the voltage measurement electrode M0 is placed between the two electrodes A0 and A0'. This arrangement has the advantage of tailoring current applied to the formation to obtain improved response from thin beds. The two survey current electrodes will provide a different focused pancake current pattern that has three positions of zero potential difference, i.e., between M1-M1', M2-M2' and M0. The spacing between the survey current electrodes can be adjusted to determine the thickness of thin bed that can be measured accurately. Still another embodiment would allow separate differential amplifiers for each pair of monitor electrodes M1, M1' and M2, M2' as shown in FIG. 5. This arrangement allows independent control of the focusing electrodes A1 and A2 that will compensate for any distortion of the current field caused by resistance inhomogeneity in the formation. For example, if a thin bed has a high resistivity formation on one side and low resistivity formation on the other side, the current field will be distorted with the apparatus of FIG. 1. The system shown in FIG. 5 will compensate for this distortion and provide a more uniform current flow through the thin bed. The dynamic range required from voltage-controlled resistors is also reduced in this configuration in contrast to FIG. 1.

Figure 8:
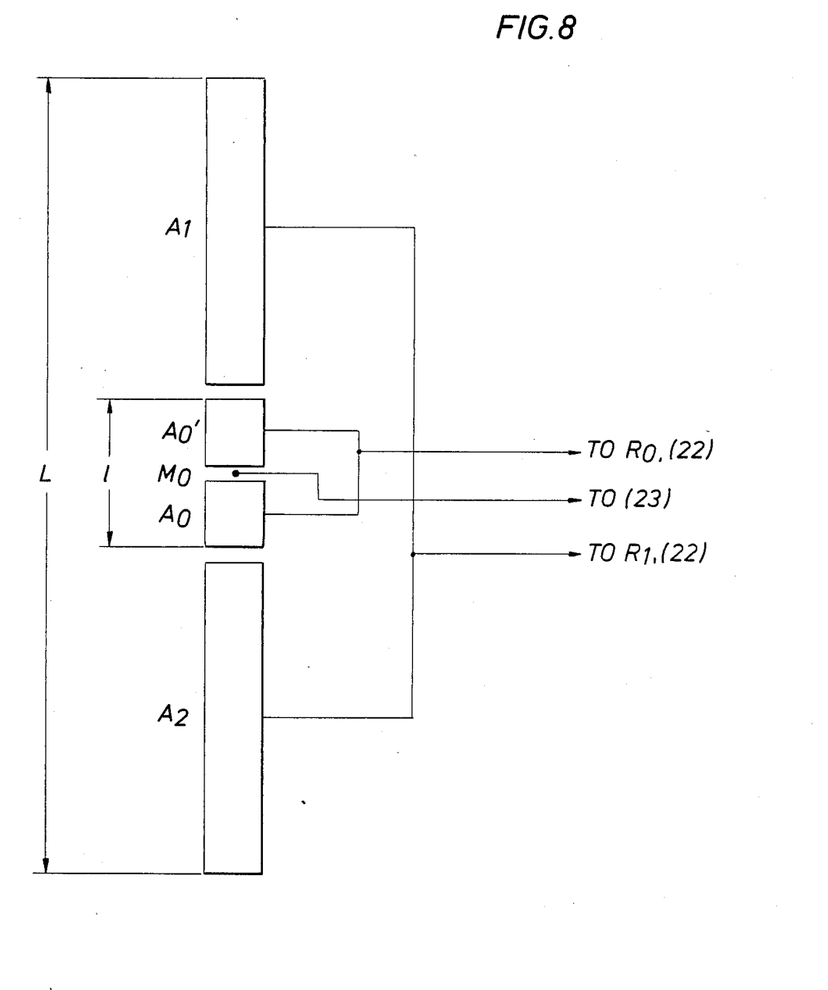
FIG. 8 is a modified focusing electrode array.

Still another embodiment would utilize long cylindrical guard current electrodes, as shown in FIG. 8, in place of the monitor electrodes M1, M1' and M2, M2'.

The current guard electrodes A1 and A2 in FIG. 8 are electrical conductors in contact with the borehole fluid and therefore automatically have zero potential difference along their length. Current guard electrodes A1 and A2 are electrically connected by a wire of negligible resistance which maintains them at the same potential. The current guard electrodes A1 and A2 are physically and electrically separated from the split survey current electrodes A0 and A0' by thin insulating disks. The voltage measurement electrode M0 is located midway between split survey current electrodes A0 and A0' and is electrically insulated from A0 and A0' by thin insulating disks. The split survey current electrodes A0 and A0' are electrically connected by a wire of negligible resistance which maintains them at the same potential.

The total length L of the long cylindrical focusing array must be much greater than the sonde diameter to obtain good current focusing. In practice, L can be made approximately 10 feet. The total length l of the split survey current electrode must be much less than L, for example, ½ to 1 foot. The length l will be the minimum thickness of thin bed that can be accurately measured by the focused induced polarization tool.

The major advantage of the long cylindrical focused electrode array is the tighter focusing of the survey current beam in the vertical direction. This allows thinner beds to be accurately measured than with the array shown in FIG. 4.

Still another modification is the use of a different type of input current signal, such as a square wave, triangular wave, time-domain waveform (i.e., bipolar square wave with dead time) or multifrequency rather than the sinusoidal current waveform disclosed in this embodiment. These and similar modifications are to be construed as covered within this invention.

What is claimed is:

1. An induced polarization logging tool comprising:
an insulated logging sonde having at least a survey current electrode, upper and lower focusing electrodes placed equal distances on each side of said survey current electrode, upper and lower pairs of non-polarizing monitoring electrodes placed between the survey current and focusing electrodes on either side of said survey current electrode to generate signals to control the current supplied to the focusing electrodes, a non-polarizing voltage measurement electrode located between one pair of said monitoring electrodes, a non-polarizing voltage reference electrode and a current return electrode, both said voltage reference and current return electrodes being located a greater distance from said survey current electrode than said focusing electrodes;
a differential-in differential-out amplifier, one monitoring electrode of each pair being direct coupled to one input of the amplifier, the other monitoring electrode of each pair being direct coupled to the other input of said amplifier;
a first current control means, said survey current electrode being direct coupled to said first current control means through a reference resistor, the first output of said differential-in differential-out amplifier being direct coupled to said current control means to control the current flow to said survey electrode;
a second current control means, said focusing electrodes being direct coupled to said second current control means, the second output of said differential-in differential-out amplifier being direct coupled to said second current control means to control the current flow to said focusing electrodes;
a source of alternating current located at the surface, one end of said source being coupled to the two current control means and the other to the current return electrode, said source supplying alternating current at various discrete frequencies between substantially 0.01 and 100 Hz;
first measurement means direct coupled to the voltage measurement and voltage reference electrodes to measure amplitude and phase of the voltage induced in the formation, and second measurement means direct coupled across the reference resistor to measure the amplitude and phase of the current flow to said survey current electrode;
transmission means coupled to said first and second measurement means to transmit said voltage and current measurements to the surface; and
means for converting said measured voltage and current to phase angle, formation resistivity, and spontaneous potential at the surface.

2. The induced polarization logging tool of claim 1 wherein said current control means are voltage-controlled resistances.

3. The induced polarization logging tool of claim 1 wherein said current and voltage measurements are sampled with separate track and hold circuits controlled by a single logic circuit.

4. The induced polarization logging tool of claim 3 wherein said voltage and current measurements are converted to digital quantities in the downhole logging tool before being transmitted to the surface.

5. The induced polarization logging tool of claim 1 wherein said survey current electrode is divided into two electrodes and connected by a wire of negligible resistance and said voltage measurement electrode is positioned between said two survey current electrodes.

6. The induced polarization logging tool of claim 1 wherein a pair of monitoring electrodes are direct coupled to seaparate differential input, differential output amplifiers, each of said amplifiers jointly controlling the survey current electrode and individually controlling the focusing electrode adjacent the pair of monitoring electrodes coupled to the amplifier.

7. The induced polarization logging tool of claim 1 wherein said measuring electrode, reference electrode, and monitoring electrodes are non-polarizable silver/silver chloride electrodes.

8. An induced polarization logging tool for measuring parameters of a formation surrounding a borehole, said logging tool comprising:
a non-conductive logging sonde;
a plurality of electrodes disposed on said sonde, said electrodes including at least a survey current electrode and two focusing electrodes disposed on opposite sides of said survey current electrode, non-polarizing monitoring electrodes disposed between the survey current electrode and each of said focusing electrodes to generate signals to control the current supplied to the focusing electrodes, a non-polarizing voltage measuring electrode, a non-polarizing voltage reference electrode and a current return electrode, both said voltage reference and current return electrodes being located a greater distance from said survey current electrode than said focusing electrodes;

circuit means coupled to said monitoring electrodes for monitoring the potential difference in the formation adjacent thereto;
first control means directly coupled to said survey current electrode and said circuit means for control of the current flow to said survey current electrode in response to the monitored potential difference;
a second control means directly coupled to said focusing electrodes and said circuit means to control the current flow to said focusing electrodes in response to the monitored potential difference;
a source of alternating current located at the surface, one end of said source being coupled to the two current control means and the other to the current return electrodes, said source supplying alternating current at various discrete frequencies between substantially 0.01 and 100 Hz;
measurement means directly coupled to said voltage measurement and survey current electrodes to measure the amplitude and phase of the voltage induced in the formation and the amplitude and phase of the current flow to the survey current electrode; and
transmission means for transmitting said measurements to the surface.

9. The induced polarization logging tool of claim 8 wherein said monitoring electrodes comprise an upper and lower pair of electrodes, one pair being located on each side of said survey current electrode.

10. The induced polarization logging tool of claim 9 wherein said voltage measuring electrode is disposed between one pair of said monitoring electrodes.

11. The induced polarization logging tool of claim 9 wherein said survey current electrode is formed by a pair of electrodes and said measuring electrode is disposed between said pair of survey current electrodes.

12. The induced polarization logging tool of claim 10 wherein said circuit means comprises a differential-in differential-out amplifier and said first and second control means comprise voltage variable resistances.

13. The induced polarization logging tool of claim 12 and in addition said transmission means including analog-to-digital conversion means for converting the voltage and current measurements to related digital quantities for transmission to the surface.

14. The induced polarization logging tool of claim 13 wherein measurement means comprises a pair of track and hold circuits, one for measuring the amplitude and phase of the induced voltage and the other for measuring the amplitude and phase of the current, both said track and hold circuits being controlled by a single logic circuit.

15. The induced polarization logging tool of claim 10 wherein said circuit means includes a pair of differential-in differential-out amplifiers, one of said amplifiers having its input coupled to one pair of said monitoring electrodes, the other of said amplifiers having its input coupled to the other pair of said monitoring electrodes, said amplifiers jointly controlling said first control means and individually controlling the second control means to individually control the focusing electrode adjacent the pair of monitoring electrodes connected to said individual amplifier.

16. The induced polarization logging tool of claim 8 wherein said measuring, reference and monitoring electrodes are non-polarizable silver/silver chloride electrodes.

17. An induced polarization logging tool for measuring parameters of a formation surrounding a borehole, said logging tool comprising:
a non-conductive logging sonde;
a plurality of electrodes disposed on said sonde, said electrodes including at least a survey current electrode and guard electrodes disposed on opposite sides of said survey current electrode, a non-polarizing voltage measuring electrode, a non-polarizing voltage reference electrode and a current return electrode, both said voltage reference and current return electrodes being located a greater distance from said survey current electrode than said guard electrodes;
means connected to said survey current electrode and said guard electrodes for generating a signal representative of the potential difference in the formation between said survey current electrode and said guard electrodes;
first control means directly coupled to said survey current electrode, said first control means controlling the current flow to said survey current electrode in response to said potential difference signal;
a second control means directly coupled to said guard electrodes to control the current flow to said guard electrodes in response to said potential difference signal;
a source of alternating current located at the surface, one end of said source being coupled to the two control means and the other to the current return electrode, said source supplying alternating current at various discrete frequencies between substantially 0.01 and 100 Hz;
measurement means directly coupled to said voltage measurement and survey current electrodes to measure the amplitude and phase of the voltage induced in the formation and the amplitude and phase of the current flow to the survey current electrode; and
transmission means for transmitting said measurements to the surface.

18. The induced polarization logging tool of claim 17 wherein said guard electrodes are long cylindrical electrodes in contact with the borehole fluid and electrically connected to each other.

19. The induced polarization logging tool of claim 18 wherein said guard electrodes have a total length at least 10 times greater than sonde diameter.

20. The induced polarization logging tool of claim 1, 8 or 17 wherein said source of alternating current is a time domain source.

* * * * *